M. B. SHERMAN.
CUTTER FOR RASPBERRY AND SIMILAR STALKS.
APPLICATION FILED AUG. 3, 1908.
922,529.
Patented May 25, 1909.
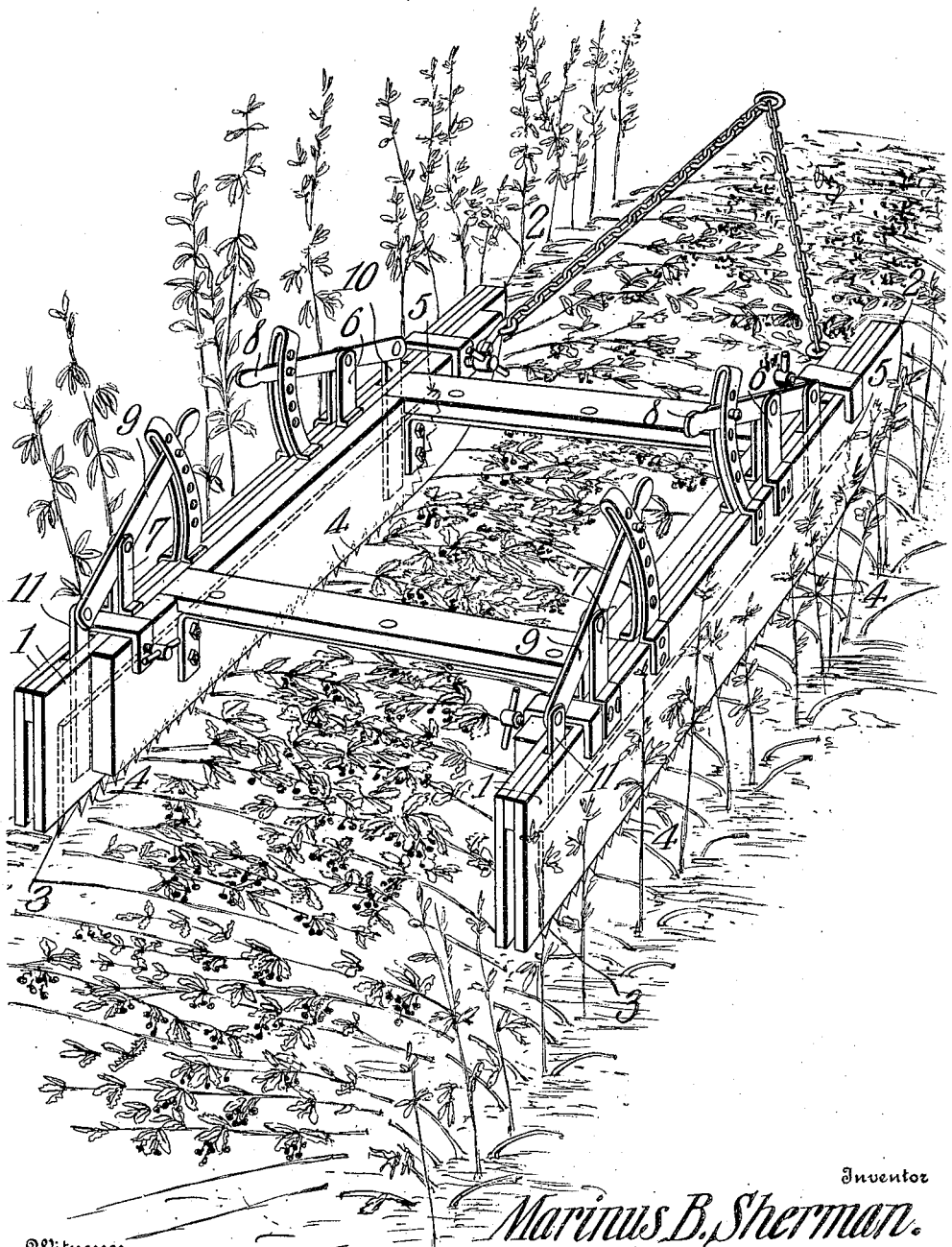

UNITED STATES PATENT OFFICE.

MARINUS B. SHERMAN, OF PAYETTE, IDAHO.

CUTTER FOR RASPBERRY AND SIMILAR STALKS.

No. 922,529.      Specification of Letters Patent.      Patented May 25, 1909.

Application filed August 3, 1908. Serial No. 446,706.

*To all whom it may concern:*

Be it known that I, MARINUS B. SHERMAN, a citizen of the United States, residing at Payette, in the county of Canyon and State of Idaho, have invented a new and useful Cutter for Raspberry and Similar Stalks, of which the following is a specification.

This invention has relation to cutters which are especially used for severing raspberry branches and it consists in the novel construction and arrangement of its parts hereinafter shown and described.

It is the practice in many sections of the country among those who make a specialty of raising raspberries for the market and specially so in arid sections to bend the vines down in the beginning of the season and the fruit which is to be harvested matures upon the reclining branches. After the fruit matures and ripens these branches are completely severed from the stalks or roots and are usually gathered in piles and permitted to dry when the fruit is removed from the vines by threshing or otherwise.

The present invention has relation to a cutting mechanism especially adapted to be used for completely severing the reclining branches from the stalks in an effectual and economical manner without injury to those stalks which are permitted to remain and which are generally referred to as the "oncoming growth".

In the accompanying drawing the figure is a perspective view of the cutters indicating its mode of operation.

The cutter consists of the side plates 1, which are in parallel relation and spaced apart. The said plates are pointed at their forward ends as at 2. The said plates are adapted to be attached to the side of a runner of a sled or to the spindles of a light wagon. The knife 3 is located between the plates 1, and is provided with a serrated or saw toothed lower edge 4. The forward end of the said knife blade 3 is also pointed as at 5. The under edge of the pointed end 5 is also provided with serrated or saw teeth similar to those indicated at 4 under the body of the blade 3. The arms 6 and 7 are mounted upon the upper edge portions of the plates 1, the lever 8 is fulcrumed to the arm 6 and the lever 9 is fulcrumed to the arm 7. The link 10 connects the forward end portion of the lever 8 with the blade 3 and the link 11 connects the rear end portion of the lever 9 with the rear end portion of the blade 3.

In operation the cutter is used as follows. It is first attached to the side of the sled or the wagon as above indicated and said sled or wagon is drawn along the row of plants the branches of which have been previously bent down as above described. By adjusting the levers 8 and 9 the blade 3 may be positioned at a desired angle with relation to a horizontal line and the said blade 3 may be projected at a distance below the lower edges of the plates 1, as the serrated saw teeth 4 of the said blade 3 encounter the reclining stems of the plants. Thus the stems are severed from the stalks and they may be gathered into piles for drying and subsequent threshing. It will also be observed that the blade 3 is carried in the line of draft or parallel with the line of draft and has no effect whatever upon the soil, its only function and object being to sever the branches of the stalks from the plants.

By reason of the fact that the forward end portions of the plates 1 are pointed the said forward ends of the said plates will ride over the prostrate branches of the plants and hold the same in close contact with the surface of the soil while the blade 3 operates upon the same effecting the separation of the branches from the stalks.

By reason of the fact that the forward end portion of the blade 3 is pointed and is at all times above the lower edges of the said plates 1 and between the forward and rear ends of the plates, the pointed extremity of the blade 3 is protected or housed to such an extent that it cannot plow under or enter the soil. Nor can it pass under the branches and lift them out of contact with the surface of the ground.

Having described my invention what I claim as new and desire to secure by Letters Patent is:—

1. A cutter comprising parallel spaced plates, a blade located between the plates, and means mounted upon the plates for adjusting the opposite ends of the blade with relation to the lower edges of the plates.

2. A cutter comprising parallel spaced plates, a blade located between the plates, lever mechanisms mounted upon the plates and being operatively connected with the blade and adapted to be manipulated so as to adjust the blade vertically with relation to the plates and also to adjust the opposite ends of the blade with relation to the lower edges of the plates.

3. A cutter comprising parallel spaced plates having pointed forward ends, a blade located between the plates and having a pointed forward end, and means mounted upon the plates and being operatively connected with the blade for adjusting the opposite ends thereof with relation to the lower edges of the plates.

In testimony that I claim the foregoing as my own, I have hereto affixed my signature in the presence of two witnesses.

MARINUS B. SHERMAN.

Witnesses:
A. N. SOLISS,
JAS. A. LACKEY.